Nov. 21, 1939. J. J. McLAUGHLIN 2,180,536
MACHINE FOR THREADING NUTS
Filed Sept. 10, 1938 8 Sheets-Sheet 3

INVENTOR
John J. McLaughlin
BY
ATTORNEY

Nov. 21, 1939.　　　J. J. McLAUGHLIN　　　2,180,536
MACHINE FOR THREADING NUTS
Filed Sept. 10, 1938　　　8 Sheets-Sheet 6

INVENTOR
John J. McLaughlin
BY
ATTORNEY

Patented Nov. 21, 1939

2,180,536

UNITED STATES PATENT OFFICE 2,180,536

MACHINE FOR THREADING NUTS

John J. McLaughlin, North Tonawanda, N. Y., assignor to Buffalo Bolt Company, North Tonawanda, N. Y., a corporation of New York Application September 10, 1938, Serial No. 229,367

18 Claims. (Cl. 10—139)

The present invention relates to nut threading machines of the floating tap types set forth in my copending application Ser. No. 58,467. Said application relates to improvements which include suspending the tap by a long shank which extends upwardly and laterally away from the axis of the tap and chuck, and then curves reversely to an approximately horizontal portion, whereby a train of previously threaded nuts forced along the shank in contact with suitable guiding surfaces, operates to suspend the tap and prevent it from rotation in the chuck; also means, such as cams on the upper end of the chuck, adapted to force the train of nuts upward on the shank independently of nuts being screwed upward by the cutting threads on the tap; also means for flooding the chuck and tap with lubricant and draining the lubricant and chips therefrom. Broadly considered, my present invention relates to machines embodying many of the above characteristics, and as to some of them this application is a continuation-in-part of said copending application.

The primary object of the present invention is to reorganize machines of the above type, as concerns various features such as supply and drainage of the oil to and from the interior of the chuck; the means for guiding and supporting the train of nuts on the shank of the tap; and forcing the threaded nuts upwardly on the shank independently of nuts being threaded on the tap. More specifically considered, the objects are to greatly increase the inlet openings for flow of lubricant into the chuck; to provide unobstructed paths for downflow of the lubricant and chips through the peripheral region radially outside of the chuck and outside the plunger that pushes the nuts into the chuck; and to provide freer outlet for upwardly flowing lubricant and chips, above the chuck.

The most important features of such reorganization of the machine include using stationary guide surfaces for only the upper, reversely curving and horizontal portions of the stationary guideway; breaking away unnecessary parts of the inner stationary guide surfaces to afford large passages for down-flow of oil and chips; and decreasing the area and resistance of the surface along which the nuts slide.

The main purpose of the long distance between the chuck and the stationary guide is to permit the lateral curvature of the shank away from the axis of the chuck to be very gradual so that there is practically no resistance to upward sliding of the nuts on this portion of the shank; then, below the stationary guideway, preferably below where the reverse curve of the shank begins, I arrange anti-friction guiding elements, and these are in the form of rolls yieldably fitting the peripheries of the threaded nuts.

The most important feature of these support and guide rolls is utilizing them as means for positively lifting the train of nuts and forcing them around the reverse bend of the shank. To this end, said rolls are positively driven at a peripheral speed substantially higher than the rate of upflow of nuts screwing off the threads of the tap. This lifting function is analogous to that of the cams at the upper end of the chuck in my copending application, but two things are to be noted: First, I have discovered that if the curvature of the shank away from the axis of the chuck is smooth enough, the mere weight of the nuts on this portion of the tap is not likely to cause marring of the threads of the lowermost nut by rotation on the uppermost cutting thread of the tap. Moreover, limitless power is available for forcing the train of nuts around the reverse curve and out of the machine, and obviates an objection to the lifting cams in the upper end of the chuck, namely, the dependence of the lifting effect on variable slip between adjacent nuts for effectiveness of the cams rotating beneath them.

From the above, it will be evident that my invention includes reorganization of the thread-cutting and tap-floating parts of the machine, in order to harmoniously combine the various radically new features above described.

The above and other features of my invention will be more evident from the following description in connection with the accompanying drawings, in which

Figs. 16 and 17 are detail views showing the nut feeding and drainage relation for the horizontal and vertical supply and feed of nuts to the chuck, Fig. 16 being a plan view on the line 16—16, Fig. 1.

With reference to these drawings, it may be explained generally that while I have shown a form wherein the rolls are driven intermittently and another form in which they are driven continuously, the principal operating parts are the same, as for instance, the stationary part of the guideway, the lifting rolls, the chuck, a gearing for reciprocating the horizontal pusher that supplies the nuts and for the vertical pusher that pushes the nuts into the chuck and onto the tap.

Figures 1, 1A:
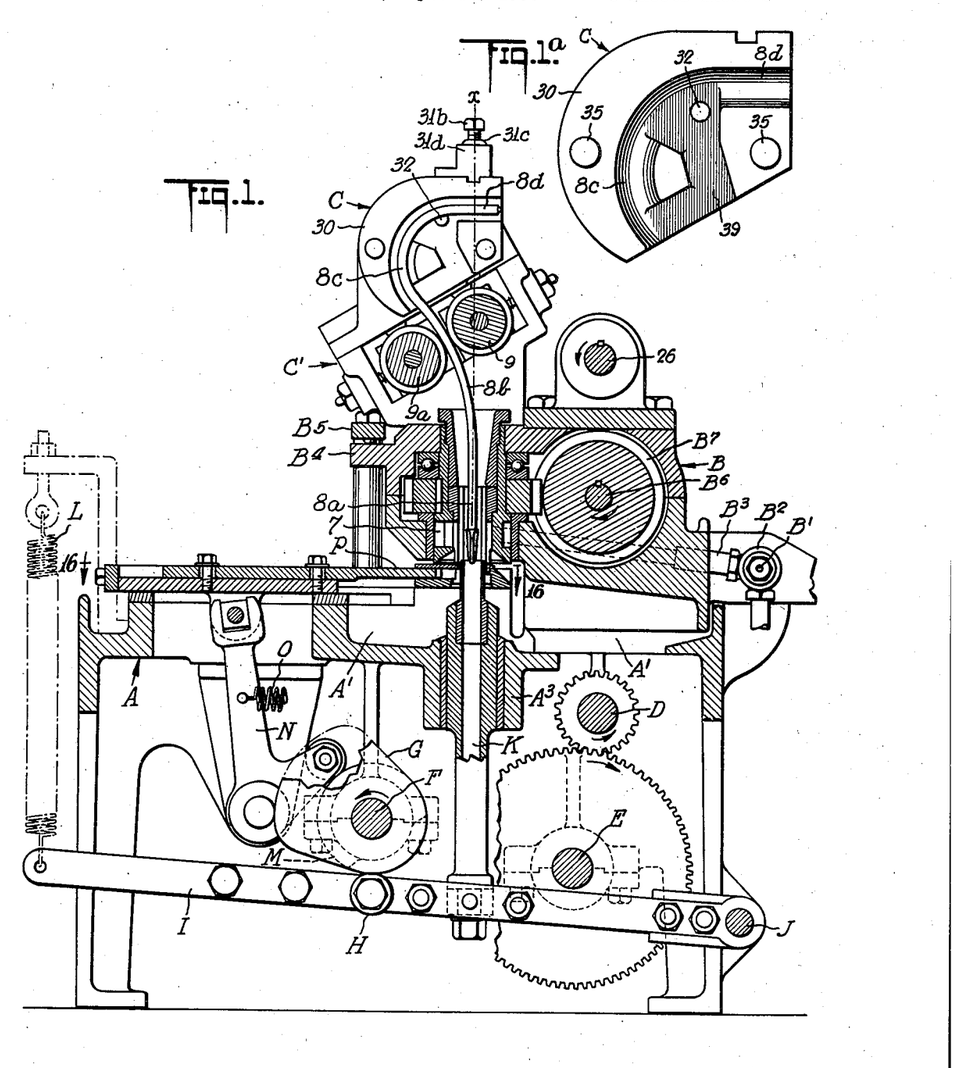
Fig. 1 is a longitudinal elevation of the machine, with the nut feeding and threading, lubricating and draining parts broken away to vertical section.
Fig. 1a is a detail view of the guide plate.

The means below the table for reciprocating the nut supplying and lifting plungers, such as lever gears, cams, etc., are capable of wide variation, but there are particular advantages in combining the novel features above the horizontal table or frame of the machine, with the reciprocatory mechanism shown in my copending application. Fig. 1 shows this preferred combination.

In Fig. 1, the principal parts are the suitably supported horizontal table A, the support B for the chuck and its driving gears, the stationary guideway C, and the lifting rolls assembly C'.

The table A is formed with a lubricant and chips collecting space A', surrounding a vertical plunger bearing $A^3$, which is integral therewith. The operating parts below the table comprise the main driveshaft D, connected by reducing gears with countershaft E which in turn is connected with cam shaft F by reducing gears not shown. Cam shaft F carries cam G, the periphery of which contacts roller H on lever I pivoted at J and tensioned upward by spring L, whereby the hollow lubricant draining plunger K is positively retracted and is spring pressed upward to push the nuts into the chuck and onto the tap. On the same cam shaft F is cam M, whereby the bell crank lever N is positively retracted against the tension of spring O, to spring push and positively retract the horizontal nut pusher P, which slides on the top table.

The above described parts below the table A may be approximately similar to those shown in my copending application, and the gear ratios may be approximately the same as illustratively described in said application, wherein, in one illustrative case the plunger K is reciprocated to push nuts onto the tap at the rate of about 62 per minute. In that case the required rate of revolution for cam shaft F was effected by having the reduction ratio between it and countershaft E, about 2 to 1, so that 62 revolutions of the cam would require about 124 revolutions of countershaft E; and if the reduction between countershaft E and drive shaft D was approximately 3 to 1, said drive shaft would be rotated about 372 revolutions per minute.

The support B for the chuck and its rotating means, is pivoted at B' and oil is supplied through an oil-tight collar $B^2$ swivelled upon the hinge member as in said pending application, the oil flowing to the chuck through conduit $B^3$ in support B. The hinged support B is provided with lug $B^4$, which is held down by clamping bar $B^5$.

The shaft $B^6$ which carries the spiral gear $B^7$ for rotating the chuck, carries at its far end a small gear not shown, meshing with a large gear on the end of drive shaft D. Here the gear ratios may be approximately the same as in said copending application, namely, if the main drive shaft rotates at 372 revolutions, the gearing between it and shaft D may be 2 to 1 multiplying, giving 620 revolutions for shaft $B^6$; and the spiral gear on shaft $B^6$ and on the chuck may have the same 45° angle, giving 1 to 1 ratio so that the chuck will rotate about 620 R. P. M. These rates may be varied within wide limits.

Figures 2, 13:
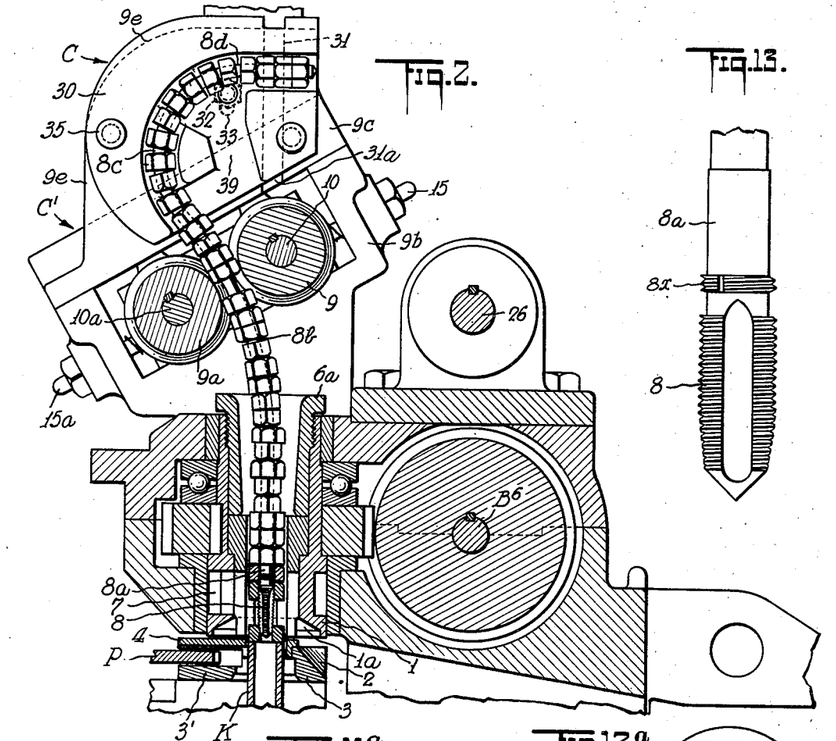
Fig. 2 shows on a larger scale, the principal nut threading parts as shown in Fig. 1.
Fig. 13 is a side elevation on a large scale, showing a form of tap that may be used.

The relations of the horizontal and vertical nut pushers, the chuck, tap, shank, train of threaded nuts, lifting rolls and stationary guideway, are shown on a much larger scale in Fig. 2.

From Fig. 2, it will be seen that chuck holder 1 is cut away at its lower end to form a free outlet passage 1a for chips and lubricant, and the bridge bar for horizontally and vertically guiding the nuts is correspondingly cut away as at 2, to facilitate the drainage.

Figure 16:
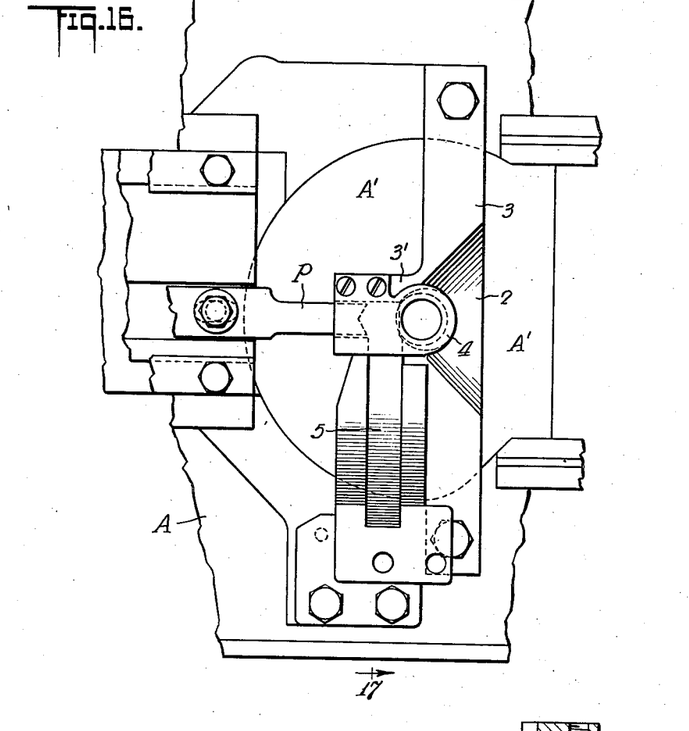
Figure 17:
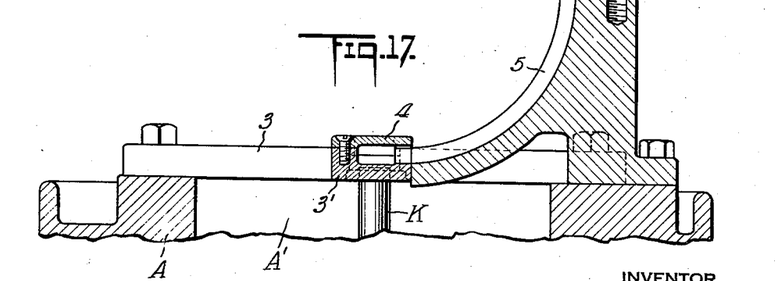
Fig. 17 a section on the line 17—17, Fig. 16.

The construction at this point will be better understood from Figs. 16 and 17, Sheet 6. Fig. 16 shows that the frame of the machine formed with the collecting space A' is bridged by a bar 3, which is cut away to form the drainage outlet 2, and it has an integral projection 3', to which the vertical nut guide 4, is rigidly secured by screws as shown. The slideway 5 down which the nut blanks slide, discharges them close to the periphery of the vertical plunger. From the above, it will be evident that the lower end of the chuck has open all around drainage, much freer than would appear from Fig. 2 alone.

Figure 11:
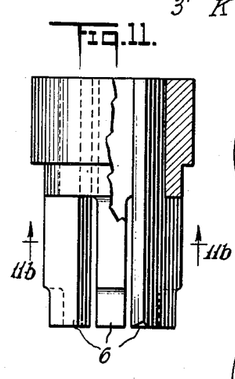
Figs. 11, 11a and 11b, Sheet 2, are views of my improved form of chuck for hex nuts, Fig. 11 being a side elevation partly in section, Fig. 11a a view of the chuck from the bottom looking upward, and Fig. 11b a similar view in section on the line 11b—11b, Fig. 11.
Figure 11A:
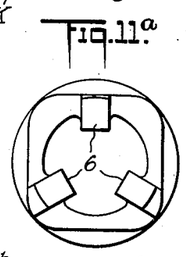
Figure 11B:
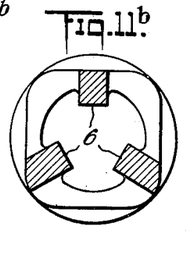
Figures 12, 12A, 12B:
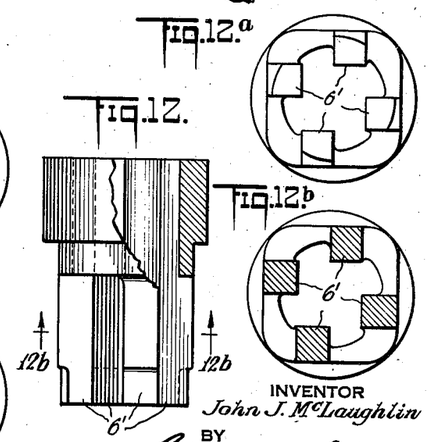
Figs. 12, 12a and 12b, Sheet 2, are similar views of my similarly improved chuck for square nuts, Fig. 12 being a side elevation partly in section, Fig. 12a a view of the chuck from the bottom looking upward, and Fig. 12b a similar view in section on the line 12b—12b, Fig. 12.

Referring again to Fig. 2, together with Figs. 11, 11a and 11b, on the same sheet, it will be seen that the free drainage through space $1a$ at the bottom of the chuck carrier is highly advantageous in connection with the novel form of chuck which I employ.

The chuck, from the bottom, up to a level well above the threads of the tap, consists solely of depending finger-like nut-engaging elements 6 which have wide spaces between them permitting free drainage through the annular enlargement $1a$ at the bottom of the chuck carrier; and equally free inlet for lubricant discharged through annulus 7, which, as explained above, is supplied through duct $B^3$. Above this level the chuck walls are solid so as to afford rigid support for said depending nut-engaging element 6.

The chuck is clamped in the chuck carrier by an annular clamping sleeve $6a$, the internal diameter of which is much greater than the nuts, and preferably it increases in diameter toward the top exit end, as shown. At the top it is entirely unobstructed so that lubricant and chips can escape freely.

The tap 8 is supported and centered in the chuck by a long shank, the lower portion of which $8a$, in the chuck is straight. Above the chuck, the portion $8b$ diverges from the axis of the chuck in a very flat curve, but this portion of the shank is long enough to bring the reversely curving portion $8c$ a sufficient distance from the axis to properly key the tap against rotation and to permit reasonably gradual recurving towards the horizontal portion $8d$, which crosses the axis of the chuck.

Figure 14:
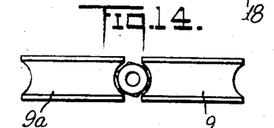
Figs. 14, 14a and 14b are detail views showing the symmetrical engagement of hex nuts in the lifting rolls, regardless of their angle of presentation.
Figure 14A:
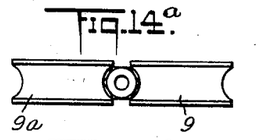
Figure 14B:
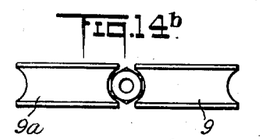
Figure 15:
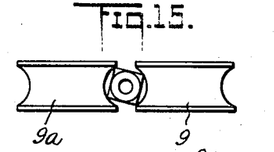
Figs. 15, 15a and 15b are similar views showing similar relations for square nuts.

Near or below the region where the reverse curve begins, are cooperating rolls 9, $9a$, the peripheries of which fit the exterior of the nuts, as shown in the series of Figs. 14 and 15, Sheet 5. These rolls are positively rotated at a peripheral rate substantially greater than the upward rate of nuts being screw-threaded on the tap so that their surfaces contact the peripheries of successive nuts (see Fig. 5); quickly lift each nut away from the nut below it (Fig. 2); and positively push the superposed train of nuts around the reverse curve and horizontal portions of the shank. The roll peripheries may be cylindrical but preferably are transversely concaved on segments of a circle having the same radius as the corner-to-corner diameter of the nuts, and said surfaces are preferably knurled.

Figure 3:
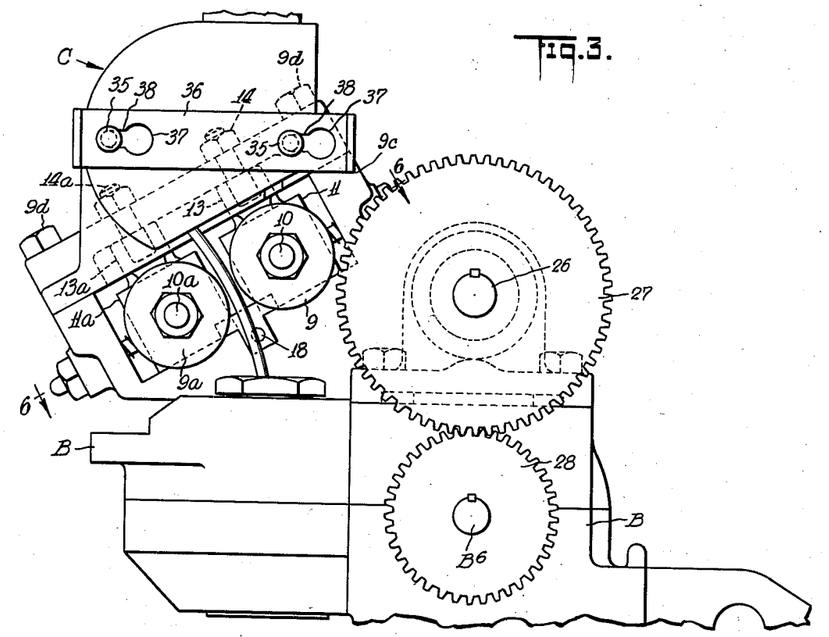
Fig. 3 is a side elevation of the parts shown in section in Figs. 1 and 2.
Figures 4, 5, 5A:
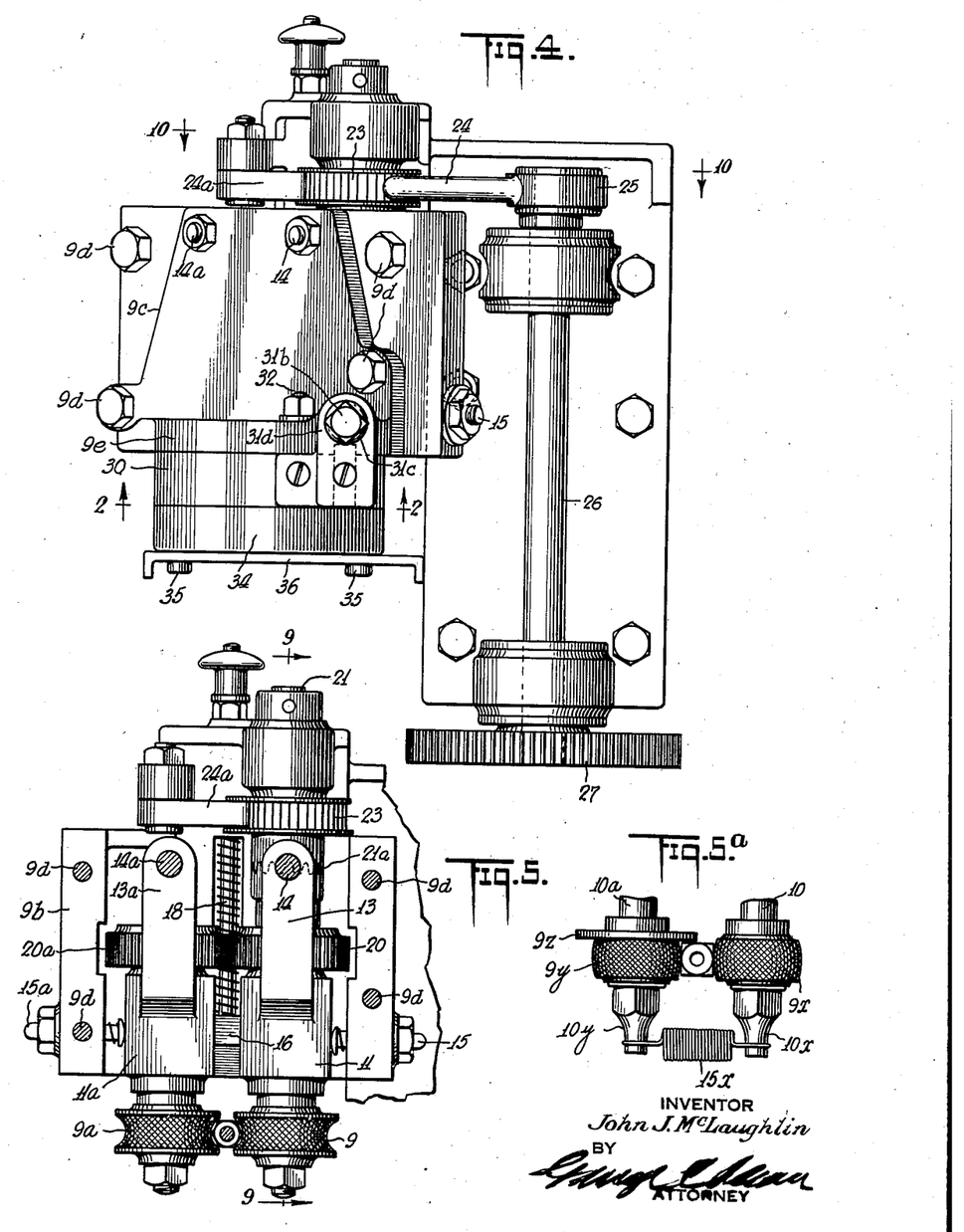
Fig. 4 is a top plan view of the parts shown in Fig. 3.
Fig. 5 is a plan view perpendicular to the casing with cover plate removed to show the interior driving and adjusting means for the feed rolls.
Fig. 5a is a detail view of a modification.

Referring to Figs. 2, 3 and 4, the stationary guideway for the reverse bend and horizontal parts of the shank, at $8c$ and $8d$, are carried by the roll housing.

As shown in said figures, the lifting roll support comprises housing $9b$, secured to the top of the chuck support B; and a cap piece $9c$ secured over the top thereof by bolts $9d$. The cap piece $9c$ is formed with an upstanding face plate $9e$ on which the stationary guideway is vertically adjustable, as described below.

Figure 6:
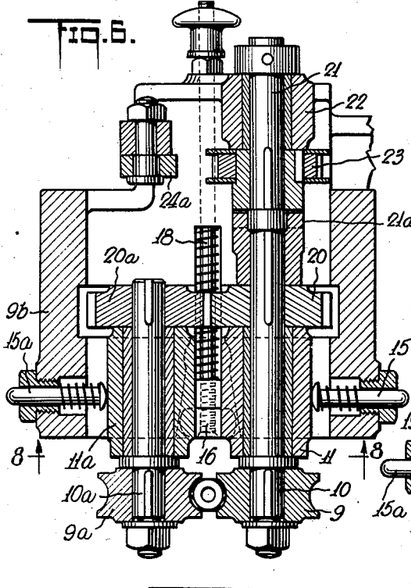
Fig. 6 is a section in the plane of the axes of the feed rolls, on the line 6—6, Fig. 3.
Figure 7:
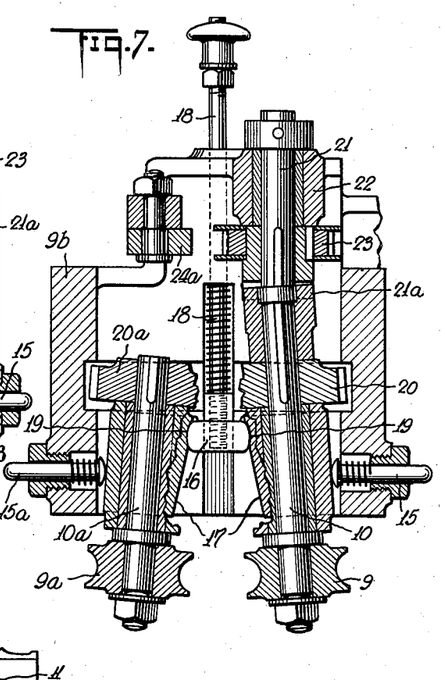
Fig. 7 is a similar section of the same parts showing the rolls separated for access to the shank of the tap.
Figure 8:
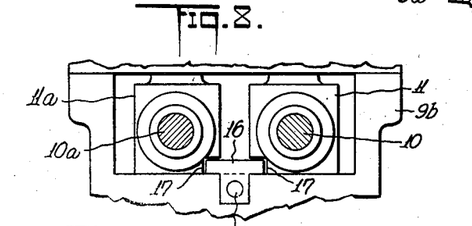
Fig. 8 is a sectional detail on the line 8—8, Fig. 6.
Figure 9:
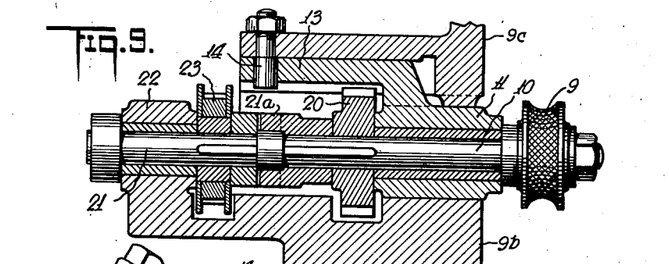
Fig. 9 is a section on the line 9—9, Fig. 5.

As shown in Figs. 6, 7 and 9, the lifting rolls 9, $9a$ are keyed to shafts 10, $10a$, journalled in bearing blocks 11, $11a$, which are slidable to and from each other in housing $9b$. As shown also in Figs. 3, 5 and 9, these bearings have long rearwardly extending radius arms 13, $13a$, turning on pivots 14, $14a$, rigidly secured in the housing cap piece $9c$; whereby the to and fro movements of said bearings are along the arcs of large circles. The bearings are urged toward each other by spring pressed plungers 15, $15a$; and the normal limit of their inward movement is fixed by an interposed slidable wedging block 16, that engages wedge surfaces 17 formed in adjacent faces of said bearing blocks.

The block 16 can be adjusted by screwing or unscrewing stem 18; and, as shown in Fig. 7, the lifting rolls can be quickly pivoted wide apart by pulling on said stem, and held in the spread position by engagement of wedge block 16, with notches 19, in the wedge surfaces 17.

The shafts are geared together as shown at 20, $20a$, and shaft 10 is flexibly connected with a non-shiftable driving shaft 21, in bearing 22 which is fixed on the frame of the machine, the torque being transmitted through longitudinally intermeshing gear teeth $21a$, which mesh in the axial line of pivot 14.

Figure 10:
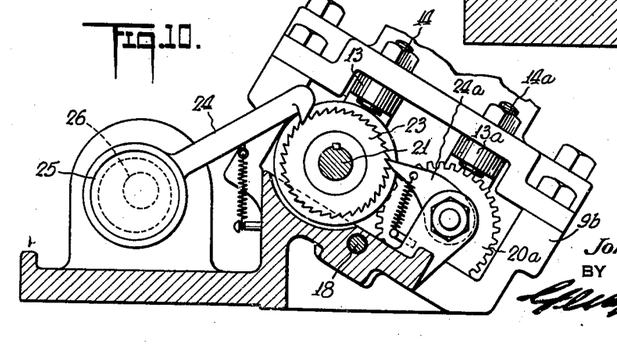
Fig. 10 is a section on the line 10—10, Fig. 4.

Shaft 21 is rotated through a ratchet wheel 23 engaged by a pawl 24 on eccentric 25 on shaft 26, Fig. 10, driven through gear 27, which, as shown in Fig. 3, meshes with a gear 28, on chuck-rotating shaft $B^6$. A cooperating holding pawl $24a$ prevents rotation of the ratchet wheel during reverse movements of the feeding pawl. As shown, gears 28, 27, are reducing gears, because screwing up of the nuts on the tap is not rapid as compared with the rate that a ratchet, such as 24, could rotate wheel 23; but it is a simple matter to design said gear ratio, throw of eccentric 25, and diameter of ratchet wheel 23, with respect to the diameter of lifting rolls 9, $9a$, so that the peripheral speed of the latter will be the required amount faster than the rate the nuts are being screwed upward on the tap.

Figure 18:
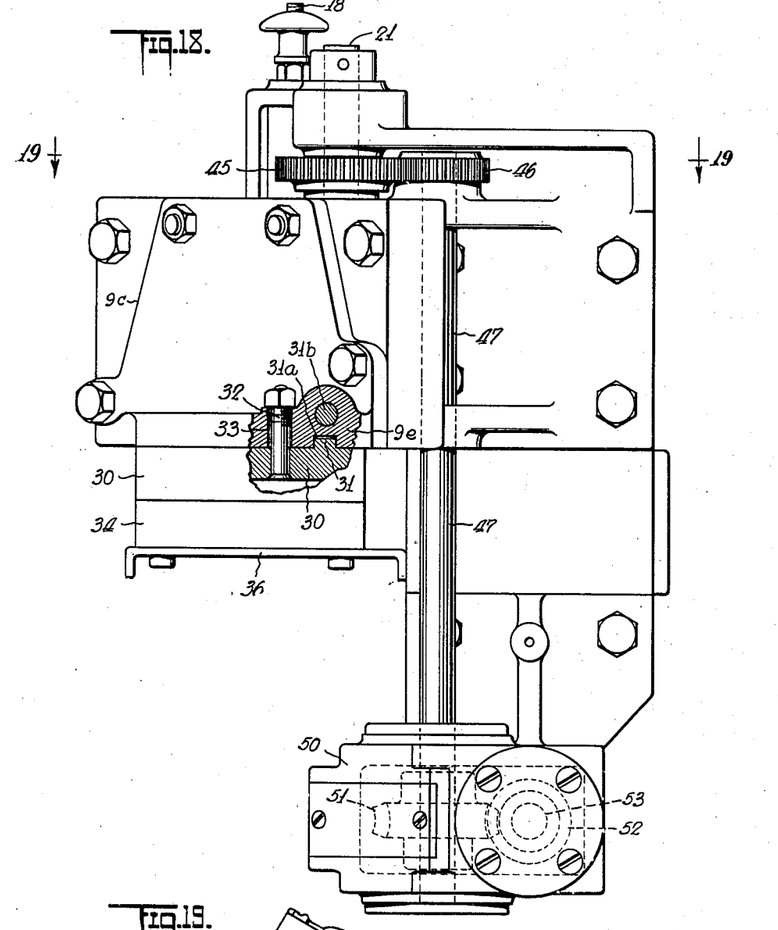
Fig. 18 is a plan view like Fig. 4, but showing a modified form in which the lifting rolls are continuously driven.
Figure 19:
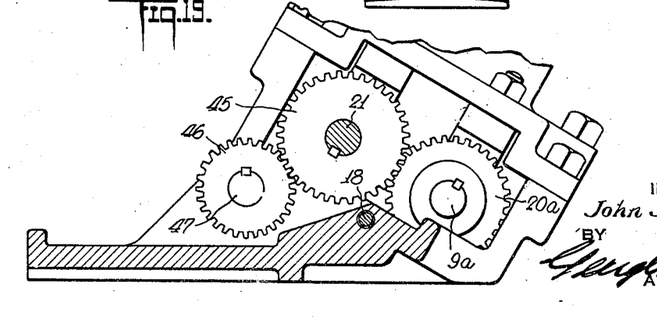
Fig. 19 is a sectional view on the line 19—19, Fig. 18.
Figure 20:
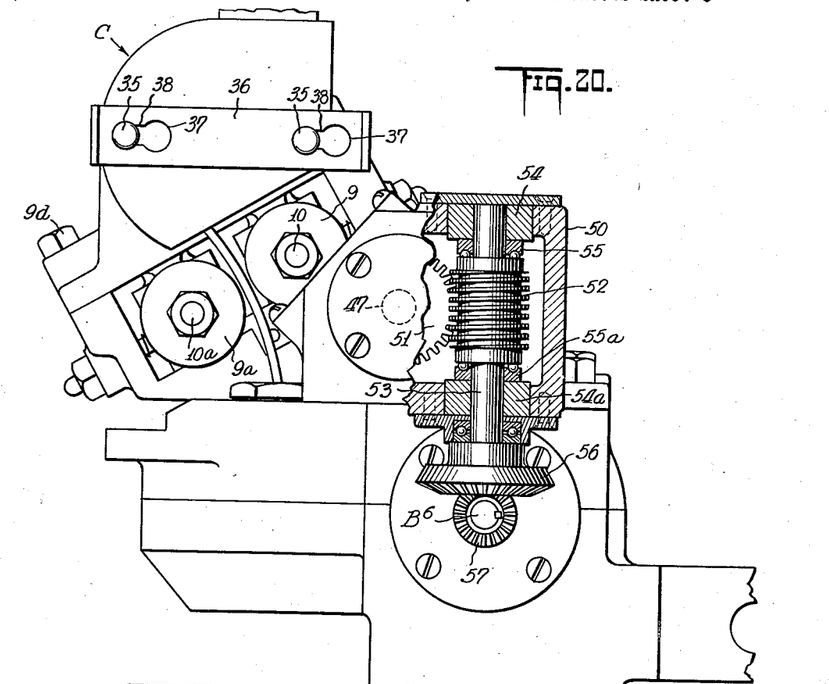
Fig. 20 is a face elevation of the assembly shown in Fig. 18, but with parts broken away to show the bevel gears and worm drive which continuously rotates the gears for the continuously rotating lifting rolls.
Figure 21:
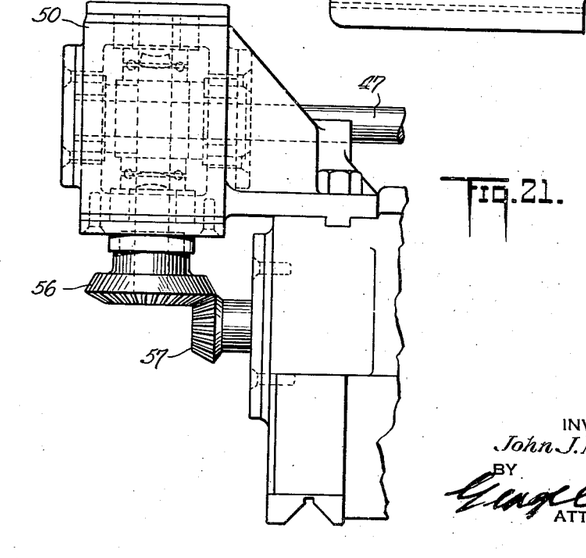
Fig. 21 is a detail elevation showing the relations of the worm and bevel gear drive of Fig. 20 when viewed from the right.

As shown in Figs. 2 and 4, the guideway is formed in opposite mating faces of two plates. One plate, 30, fits against the vertical face of upstanding face plate $9e$, and is vertically adjustable thereon, being guided by a long key 31 integral with the rear face of said plate 30 and fitting a vertical keyway $31a$ in said face plate $9e$. As indicated in Figs. 1, 4 and 18, plate 30 is vertically adjusted by a screw $31b$, threaded in the top of the face plate $9e$ and swiveled at $31c$, to a bracket $31d$, which is keyed in and secured to the top edge of said plate 30. It is clamped in position of desired adjustment by a rearwardly projecting stud bolt 32, which projects through and is vertically slidable in slot 33, in said face plate $9e$.

The other half of the stationary guideway is formed in plate 34, the half guideway formed in the inner surface of said plate being held in registry by stud bolts 35, the projecting ends of which are provided with means for clamping plate 34 against plate 30, preferably by means of notches in the heads of said bolts, slidably locked by a clamping bar 36, having circular openings 37 large enough to admit the heads of the stud bolts 35, and slot portions 38 that slidably fit necks under the projecting heads of said stud bolts.

Arranged as above, it will be obvious that all parts of the guideway are readily accessible by simply sliding the latch-bar to the left, removing it, and removing plate 34 which contains the outer half of the guideway. In this position, the other half of the guideway may be adjustable vertically by loosening bolt 32 and sliding it in slot 33. As shown in Fig. 2, this adjustment raises or lowers the stationary guideway parallel with the axis of the chuck, and in the plane of engagement of nuts with the lifting rolls.

Figs. 1 and 2 show that nearly half the length of the shank is between the tap and the lifting rolls, where the nuts are guided only by the shank; and less than half the shank is in the stationary guideway where the nuts are peripherally guided by sliding contact.

Furthermore, as best shown in Fig. 1a, only the outer concave guiding surfaces are continuous, from the entrance of the guideway around through the reverse curve portion 8c, and horizontal portion 8d to and beyond the end of the shank, while the parallel inner surfaces of the guideway are cut away, as shown, so that there is a complete tubular guideway for only about one-third of the reversely curving portion in the region 8c; and for the horizontal suspension surface in the region 8d.

Said cut-away arrangement for the interior reverse bend surfaces seems to work particularly well in combination with the lifting rolls 9, 9a, because they afford all the power required to force the train of nuts around said reverse bend and along the horizontal suspension surfaces, and the very considerable resistance to such forcing tends to cause the nuts to follow the continuous outer surface of this curve. Such cutting away of inner guide surface leaves a wide open passage 39, of depth greater than the diameter of the nuts, for down-drip of lubricant and chips from train of nuts pushed up by the lifting rolls.

As will be obvious from Fig. 1, the curvature of the shank of the tap, at the level of the lifting rolls, diverges only about 30° from the axial line $x$; and maximum divergence from said axis is only about 40°. This long length of slightly curving shank is accurately aligned in the axis of the chuck by the nuts being screwed on the tap; and at the upper end, by the nip of the lifting rolls, and all of this part of the shank is of such flat curvature that down-pull by nuts on the tap has practically no straightening effect on the shank.

The shape of the lifting rolls 9, 9a, where they contact with the moving column of nuts on the tap shank may be almost any shape such as flat, radial, V-shape, hexagon, or polygon; or they may be circumferentially grooved or convexed. In any case their nut-engaging surfaces are preferably knurled or corrugated as indicated in Figs. 5, 5a. When the peripheries are grooved on arcs of a circle of the same diameter as the corner-to-corner diameter of the nuts (see Figs. 14, 14a, 14b, and 15, 15a, 15b), they have a support and guide effect which is even better than that of a stationary guide surface. The reason is that the wedge piece 16, Fig. 6, is accurately adjusted so that the peripheries of the rolls afford a pass which is normally only a trifle narrower than the diameter of the nuts, and the spring pressed plungers 15, 15a permit them to yield slightly, so as to nip and feed the successive nuts between them. Such positive grip of the nuts by the roll peripheries affords a better centering effect than is possible with stationary guide surfaces, because the latter must always be a loose fit in order to permit the nuts to slide freely.

Figure 15A:
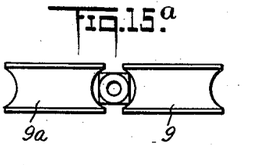
Figure 15B:
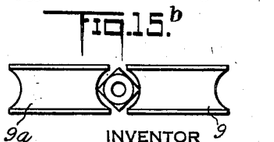
Figure 15C:
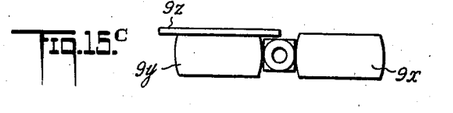
Fig. 15c is a similar view of a modification.

The above described relations apply for square nuts, as shown in Figs. 15, 15a, 15b, but it has been found that for square nuts, rolls with convex peripheries, such as shown in Fig. 15c and Fig. 5a, give better results. In Fig. 5a, the shafts 10, 10a may be the same as in Fig. 5, and geared, pivoted and driven in the same way. Differences are that the peripheries 9x, 9y are transversely convexed instead of concave and one of them has a washer or face collar 9z, whereby square nuts approaching the rolls with corners presented at various angles, are engaged by said face plate 9z, and are thereby gradually rotated on their axis to present opposite parallel sides, instead of corners, for nipping engagement by the roll.

Another feature of Fig. 5a is that instead of having the roll bearings spring pressed towards each other by separate springs, applying thrust on the outside of the bearings as at 15, 15a, Fig. 5, the ends of the shafts in Fig. 5a are provided with cap nuts 10x, 10y having projecting ends pulled together by opposite ends of a single spring, 15x. This is a simple way of insuring the same inward spring tension on both lifting rolls.

The open space between the chuck and the stationary guideway renders this part of the shank, the nuts thereon, and the lifting rolls, directly accessible; and the front section 34, of the stationary guideway is instantly removable by manipulating the latch bar 36.

In addition to the above mechanically valuable features, there is added the above referred to facility for down drainage of lubricant and chips through the stationary guide passages, and through the open drainage passage 39; also free drainage between the lower ends of chuck fingers 6, to and through the adjacent cut-away portion 1a and 2.

In certain cases, a tap may be employed which has a clearing screw 8x of the same pitch, but looser fit of threads, as compared with the cutting threads 8. This may be useful to lift threaded nuts to prevent marring of the thin lower end of the thread by idle rotation on the top cutting thread of the tap, particularly where the nuts are large and heavy; but with ¼ inch nuts for which this machine was designed, said clearing thread is entirely unnecessary.

Referring to Figs. 1 and 2, the operation of the apparatus will be obvious. The nuts slide down supply channel 5 (Figs. 16 and 17), close to the path of the vertical plunger K, and the horizontal pusher P pushes them over said plunger. Plunger K is retracted positively by the cam G, and urged upward by spring L, according to the curve of said cam, until the nut contacts with the tap. Thereupon the plunger continues its upward movement under control of spring L, which is adjusted to approximately balance the down pressure of threaded nuts below the lifting rolls and the resistance of nuts being screwed upward on the tap. As indicated in Fig. 2, the rate of chuck rotation, rate of nut feed, and pitch of tap threads are coordinated so that a new nut is being screwed onto the lower end of the tap before the nut above it screws off the upper end of the tap. This insures centering of the tap in the chuck and also insures ample space between the nuts for a flood of lubricant to wash out chips through 1a, 2, and through the tubular interior of plunger K.

As good or better results may be had by operating the lifting rolls continuously instead of intermittently. Various combinations of gears could be used, but the one shown in Figs. 18, 19, 20 and 21 is neat and compact and can be used in the limited space available. In these figures, all parts of the machine are supposed to be the same as in the preceding description, but in place of the ratchet wheel, 23, is substituted a spur gear 45 on roll shaft 21. This gear is driven by a gear 46 on horizontal shaft 47, which extends into the worm gear housing 50 and is there provided with a worm gear 51 which is driven by worm 52 on vertical shaft 53, which turns in bearings 54, 54a. Between the worm 52 and the bearings are ball thrust bearings 55, 55a. On the lower end of shaft 53 is a bevel gear 56 meshing with a pinion 57 on chuck-driving shaft B⁶.

The peripheral speed of the rolls must be considerably greater than the speed at which the nuts travel off the cutting threads of the tap; how much greater depending somewhat on the thickness of the nuts and the length of shank below the lifting rolls. In a particular case, tapping ¼" hex nuts, with about 17 threaded nuts below the lifting rolls, and with the chuck and its drive shaft $B^6$ revolving 620 R. P. M., the nuts would be screwed upward on the tap at the rate of about 31 inches per minute. Using grooved or convex corrugated lifting rolls $1\frac{9}{32}$" in diameter for hex and square nuts measuring $\frac{7}{16}$ inch across flats, the peripheral speed of rolls should be about 50 inches per minute in order to properly separate the nuts traveling 31 inches per minute; or with grooved lifting rolls $1\frac{5}{32}$ inches in diameter for square nuts of the same width across the flats, the peripheral speed of the lifting rolls should be about 45 inches per minute. This would require that said lifting rolls revolve at about 12.4 R. P. M. This rate may be derived for said chuck drive shaft $B^6$, which rotates at 620 R. P. M. by a 50 to 1 reduction in the train between said shaft and the lifting rolls. This may be accomplished by having a 2 to 1 reduction between the beveled gears 57, 56, at the chuck shaft; a 20 to 1 reduction between the worm 52 and worm gear 51; and a 5 to 4 reduction between gear 46, on shaft 47 and gear 45 on lifting roll shaft 21. The above describes a specific case, but other speeds, other ratios and other gear combinations could be used.

I claim:

1. A nut threading machine including frame members formed with an open drainage depression for lubricants and chips; a bridge piece across said depression forming a support for lateral supply of nut blanks; a lateral plunger for pushing blanks over an upward opening in said bridge piece; a plunger reciprocating upwardly through said opening for pushing said blanks upward; and a stationary support carrying a rotary chuck above and in alignment with said pusher, its periphery rotating above one edge of said bridge piece, the bottom of the chuck and the adjacent edge of said bridge piece being correlatively sloped downwardly away from the chuck opening to permit free escape of lubricant and chips; said support having passages for supplying lubricant to the chuck, and said chuck having nut rotating elements in the form of fingers extending downwardly, with wide spaces between them for lubricant from said supply passages; a tap which is centered in the axis of rotation of said chuck fingers by nuts being threaded on the tap, and which has an upwardly extending shank having an intermediate portion inclined away from the axis of the chuck and on which the nuts are exposed for open down-drainage of lubricant and chips; power driven means for successively lifting the exposed nuts at rates substantially greater than the rate at which they are propelled by nuts screwed upward on the tap; said shank having also an upper portion that is reversely curved to an approximately horizontal portion crossing the axis of the chuck, and which is floatingly supported and prevented from rotation by a train of threaded nuts sliding thereon and slidingly engaging a similarly curved stationary guideway; support portions of said guideway between the reversely curved part and the part that crosses the axis of the chuck being intersected by an interior passage affording free down-drainage for lubricants and chips.

2. A nut threading machine including frame members formed with an open drainage depression for lubricants and chips; a bridge piece across said depression forming a support for lateral supply of nut blanks; a lateral plunger for pushing blanks over an upward opening in said bridge piece; a plunger reciprocating upwardly through said opening for pushing said blanks upward; and a stationary support carrying a rotary chuck above and in alignment with said pusher, and its periphery rotating above one edge of said bridge piece, the bottom of the chuck and the adjacent edge of said bridge piece being correlatively sloped downwardly away from the chuck opening to permit free escape of lubricant and chips.

3. An apparatus as specified in claim 2, and wherein the chuck support has passages for supplying lubricant to the chuck, and the chuck has nut rotating elements in the form of fingers extending downwardly, with wide spaces between them for inflow of the lubricant, and to permit free down drainage thereof.

4. A nut threading machine including an upwardly extending rotary chuck, a tap having a long shank through which it is supported in said chuck, the shank of said tap having an intermediate portion curved away from the axis of the chuck to an upper portion at approximately a right angle to said axis, and means for suspending the shank including guide rolls symmetrically disposed with respect to the axis of an intermediate portion of said shank; means for driving said rolls at peripheral speed substantially greater than the rate of up-feed by threaded nuts in the chuck and, above said rolls, an open-bottom guideway laterally enclosing a horizontal portion of said shank.

5. Apparatus as specified in claim 4, and wherein the shank is reversely curved into said horizontal portion, and the inner walls of the guideway below and above the reversely curving portions are cut away to permit free drainage of chips and oil.

6. Apparatus as specified in claim 4, and wherein the guide rolls are spring pressed, to nip successive threaded nuts between them and are power driven at peripheral speed substantially greater than the rate of upfeed by threaded nuts in the chuck.

7. A nut threading machine including an upwardly extending rotary chuck, a tap having a long shank through which it is supported in said chuck, the shank of said tap having an intermediate portion curved away from the axis of the chuck to an upper portion at approximately a right angle to said axis, and means for suspending the shank including guide rolls symmetrically disposed with respect to the axis of an intermediate portion of said shank; and, above said rolls, an open-bottom guideway laterally enclosing a horizontal portion of said shank; said guide rolls being mounted on power driven shafts that are pivotally mounted to swing to and from one another and are spring pressed to nip successive threaded nuts between them, and are power driven.

8. Apparatus as specified in claim 7, and wherein the position of the spring pressed rolls is gauged by an intervening block, whereby said rolls may be separated, against the spring pressure.

9. A nut threading machine including a power source, an upwardly extending chuck, a chuck gear rotating the chuck from said power source, and a tap having a long shank positioned in the axis of the chuck by nuts that are being threaded on the tap and floatingly suspended and prevented from axial rotation by a train of threaded nuts sliding along a reversely curving portion of the shank in a similarly curving stationary guideway, in combination with separately driven feed means adapted to laterally engage successive nuts on an intermediate portion of the shank and push them toward the guideway at speeds greater than the rate at which they are propelled by nuts screwing off the tap.

10. Apparatus as specified in claim 9 and wherein the feed means is geared to said power source independently of the chuck rotating gear.

11. Apparatus as specified in claim 9 and wherein the separate driving means for the feed means is connected to the power source through gearing independent of the chuck gear.

12. Apparatus as specified in claim 9 and wherein the nut feeding means includes rolls having peripheries that laterally engage the nut.

13. Apparatus as specified in claim 9 and wherein the nut feeding means includes rolls having peripheries that laterally engage the nut, said rolls being driven continuously through reducing gears.

14. Apparatus as specified in claim 9 and wherein the nut feeding means includes rolls having peripheries that laterally engage the nut, said rolls being driven intermittently through pawl and ratchet mechanism geared to the power source.

15. Apparatus as specified in claim 9, and wherein the nut rotating portions of the chuck are depending fingers with wide spaces between them whereby lubricant has free inlet through said spaces and free down drainage between the lower end of the fingers.

16. A nut threading machine including an upwardly extending rotary chuck and a tap having a long shank positioned in the axis of the chuck by nuts that are being threaded on the tap and floatingly suspended and prevented from axial rotation by a train of threaded nuts sliding along a reversely curving portion of the shank in a similarly curving stationary guideway, in combination with driven feed means adapted to laterally engage successive nuts on an intermediate portion of the shank and push them toward the guideway at speeds greater than the rate at which they are propelled by nuts screwing off the tap, and said stationary guideway being open at the bottom, and having portions of its inner guide surfaces cut away to form a passage for free down drainage of lubricant.

17. A nut threading machine including an upwardly extending rotary chuck and a tap having a long shank positioned in the axis of the chuck by nuts that are being threaded on the tap and floatingly suspended and prevented from axial rotation by a train of threaded nuts sliding along a reversely curving portion of the shank in a similarly curving stationary guideway located above the chuck, and said stationary guideway being open at the bottom, and having the upper reversely curving portions of its inner guide surfaces cut away to form a passage for free down drainage of lubricant.

18. A nut threading machine including an upwardly extending rotary chuck having a tap suspended in position by a long upwardly extending shank, said shank curving laterally away from the axis of the chuck in a curve of large radius, and thereabove having a portion curving circularly reversely to a portion at approximately a right angle to the axis of the chuck, and a stationary guideway enclosing the upper reversely curving and horizontally extending portions of the shank and formed with interior guiding surfaces that are tubular adjacent an upwardly extending arc of the reverse curve and also adjacent said horizontal portion, but interiorly cut away at intermediate points, so as to afford free drainage downward, while also affording peripheral and lateral guide surfaces for the threaded nuts.

JOHN J. McLAUGHLIN.